Feb. 12, 1924.

C. F. BUSSE

CORN HARVESTER

Filed April 9, 1921

Inventor
Carter F. Busse
By Lancaster and Allwine
Attorneys

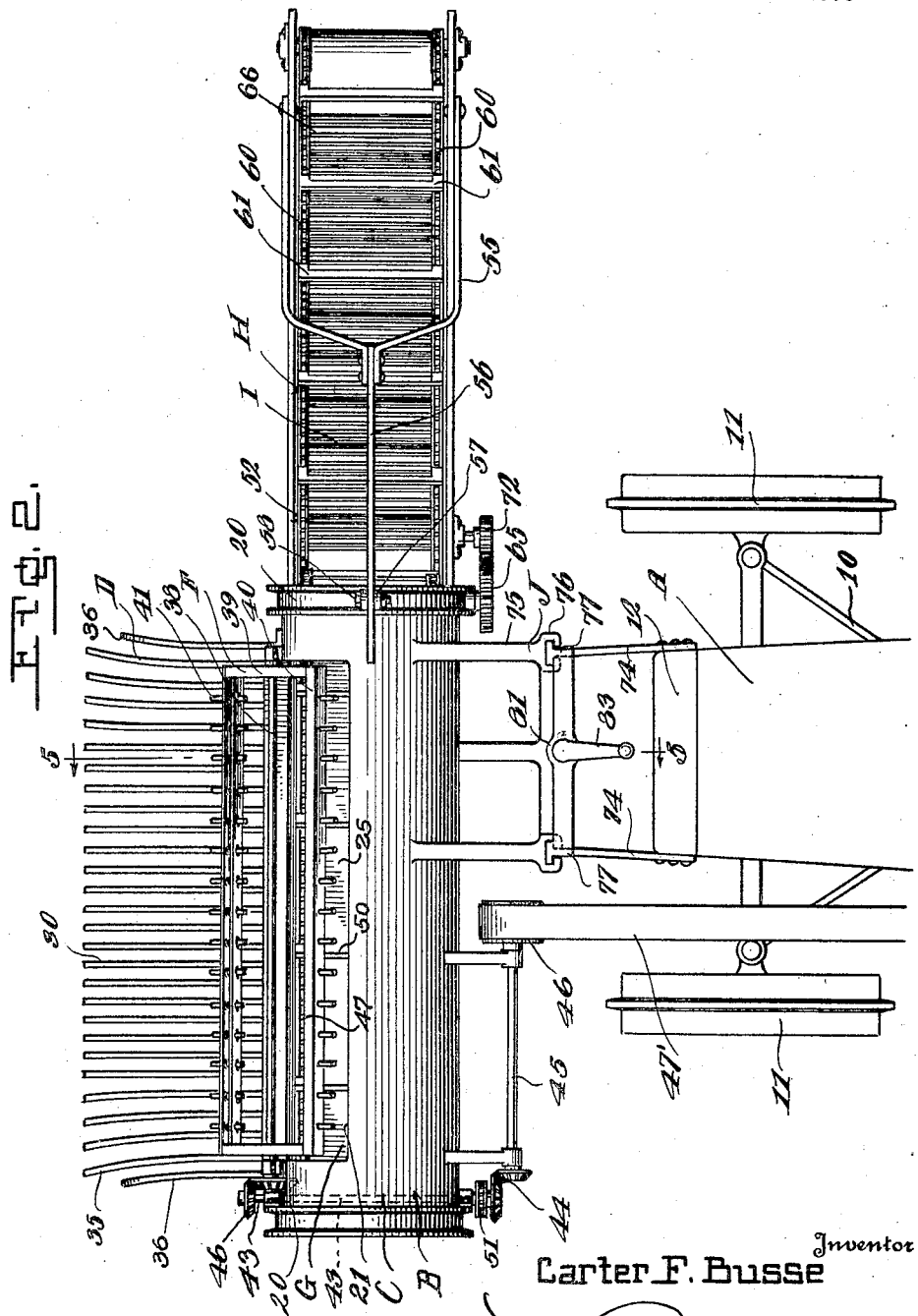

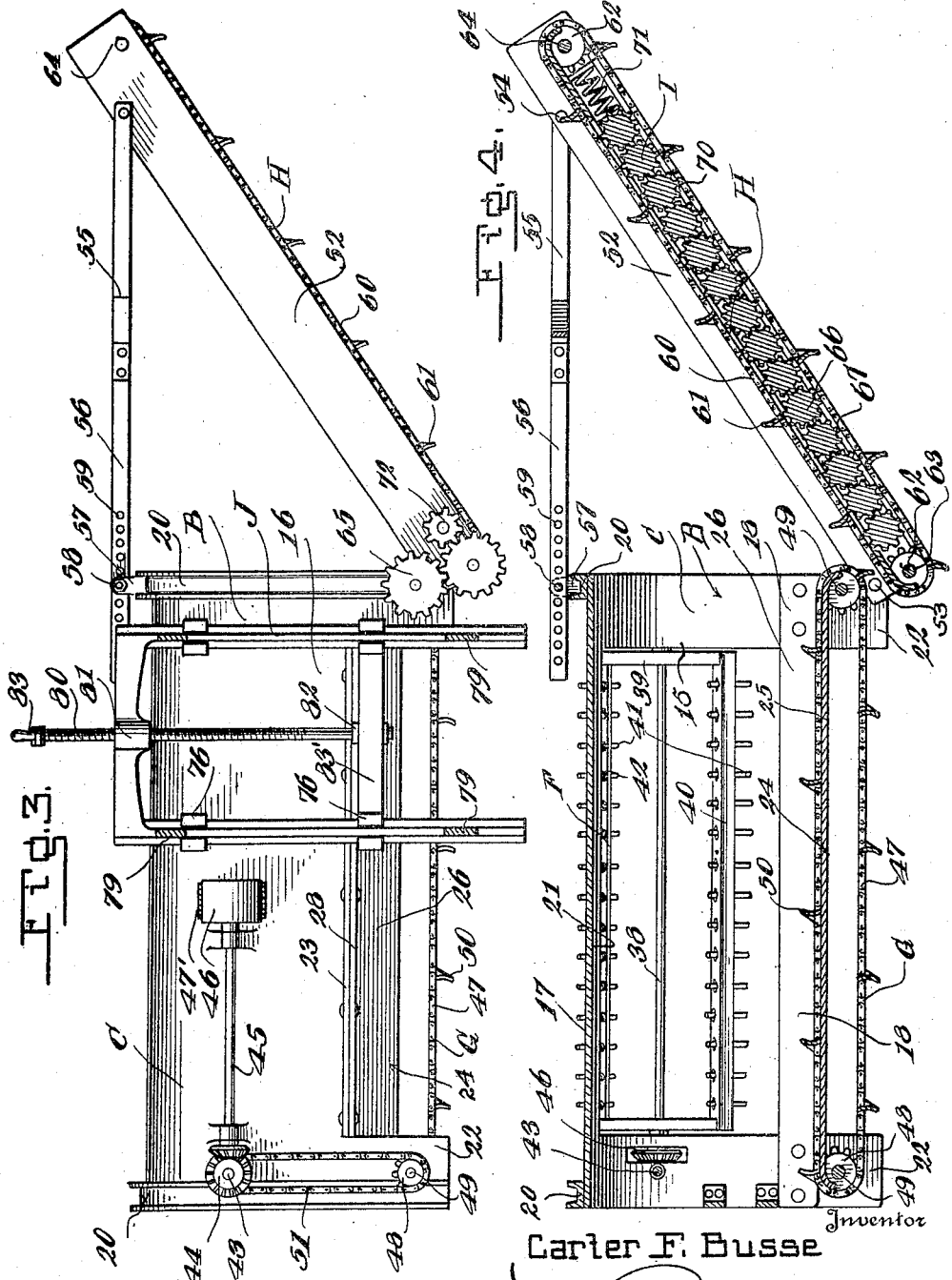

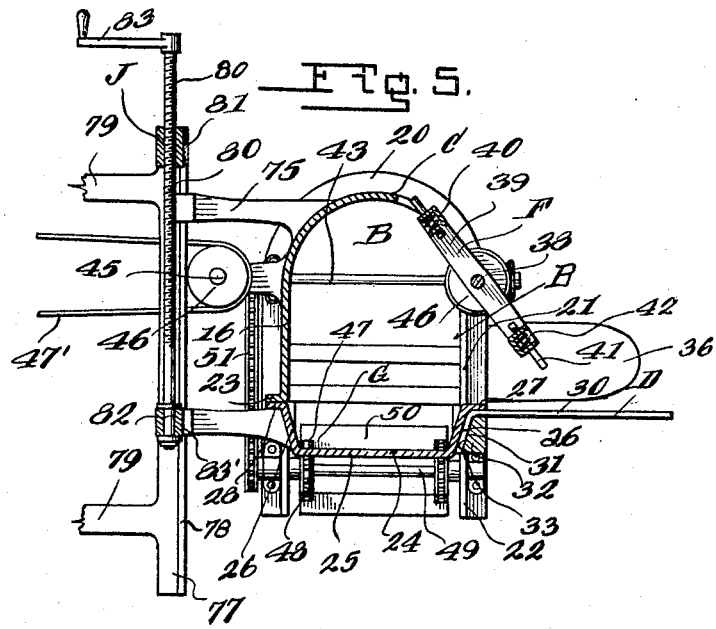
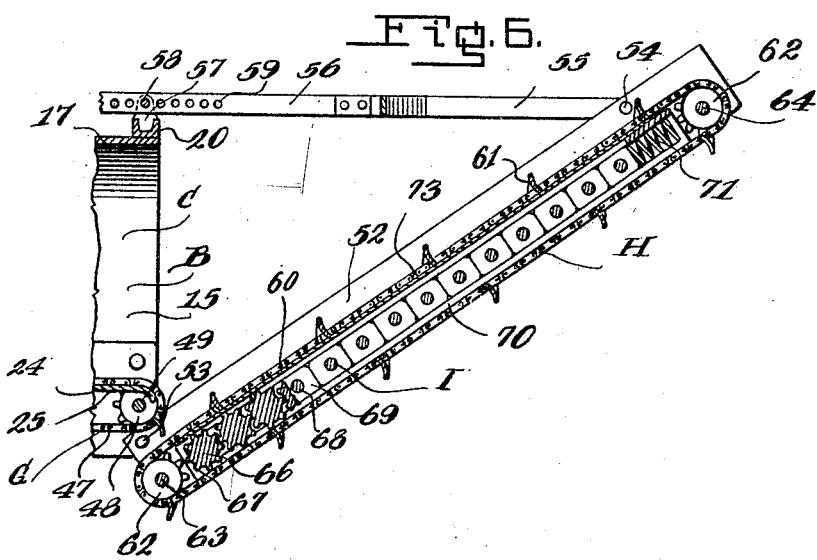

Patented Feb. 12, 1924.

1,483,775

UNITED STATES PATENT OFFICE.

CARTER F. BUSSE, OF CHAMOIS, MISSOURI.

CORN HARVESTER.

Application filed April 9, 1921. Serial No. 459,887.

*To all whom it may concern:*

Be it known that I, CARTER F. BUSSE, a citizen of the United States, residing at Chamois, in the county of Osage and State of Missouri, have invented certain new and useful Improvements in Corn Harvesters, of which the following is a specification.

This invention relates to harvesters, and the primary object of the invention is to provide an improved corn harvester attachment for tractors, which is adapted to be detachably connected directly to the tractor and carried by the tractor at the forward end thereof.

Another object of the invention is to provide an improved corn harvester, which will effectively strip the ears of corn from the standing stalks and deposit the same into a suitable hopper carried by the platform, the hopper having means arranged therein for carrying the ears of corn to a suitable barge or wagon which can be driven alongside of the tractor.

A further object of the invention is to provide an improved tractor carried harvester having a novel means for stripping the ears of corn from the standing corn stalks and for throwing the ears of corn into the hopper.

A further object of the invention is to provide a novel means for husking the corn when so desired, during the elevating of the ears of corn.

A still further object of the invention is to provide a novel means for associating the harvester attachment with the tractor, so that the height of the harvester can be readily regulated according to the character of the corn or other grain which is to be harvested.

With these and other objects in view, the invention consists in the novel construction, arrangement and formation of parts, as will be hereinafter more specifically described, claimed and illustrated in the accompanying drawings, forming a part of this specification, in which drawings:

Figure 2 is a top plan view of the improved corn harvester, operatively connected with a tractor.

Figure 3 is a rear elevation of the harvester attachment, showing the supporting arms therefor in section, as well as the drive belt.

Figure 4 is a longitudinal section through the improved corn harvester attachment.

Figure 5 is a transverse section through the improved harvester and supporting means carried by the tractor taken on the line 5—5 of Figure 2.

Figure 6 is a fragmentary longitudinal section through a portion of the harvester, showing the means carried by the elevator so as to prevent the husking of the corn, when it is desired to retain the husk thereon.

Referring to the drawings in detail, wherein similar reference characters designate corresponding parts throughout the several views, the letter A indicates a tractor, and B the improved harvesting attachment therefor.

Figure 1:
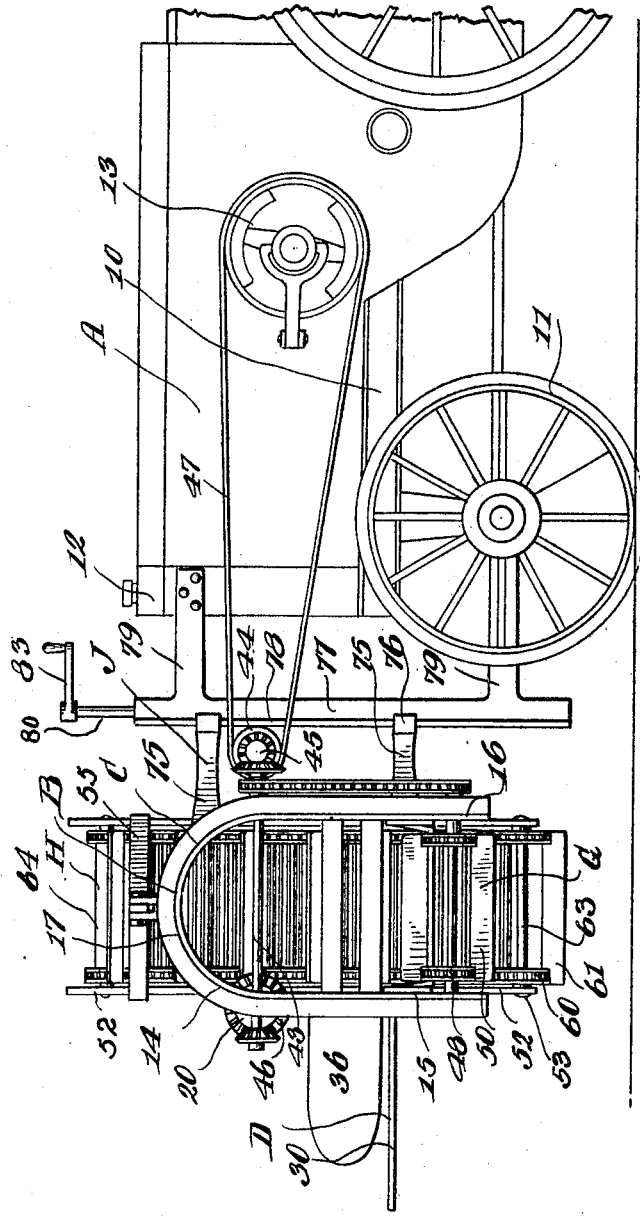
Figure 1 is a fragmentary side elevation of a tractor with the improved corn harvesting attachment connected therewith.

The corn harvester attachment B is adapted to be attached to any type of tractor, and the tractor A has been shown merely for illustrating the use of the invention, and it is to be understood that the same may be of any desired make, size or style.

The tractor A, as shown includes the frame 10, the front steering wheels 11, which are mounted upon the usual steering spindles carried by the forward dead axle, the radiator 12, and the drive pulley 13.

The improved harvester attachment B includes the hopper C, the stripping platform D, the pulling and carrying reel F, the conveyor mechanism G, the elevating mechanism H, the husking mechanism I, and the connecting means J for attaching the harvester to the tractor. The hopper C includes an elongated body, preferably but not necessarily formed of sheet metal, and includes the front and rear walls 15 and 16 and the upper wall 17. The front and rear walls 15 and 16 are connected respectively adjacent to their lower ends to strength beams 18, and the hopper may be braced adjacent to its ends, by U-shaped strength beams 20. The beams 20 may be of channel construction, if so desired.

The hopper C extends transversely across the tractor A and projects laterally from one side thereof. The forward wall 15 of the hopper is provided with a longitudinally extending elongated opening 21, through which the ears of corn are adapted to enter into the hopper, when the same are pulled from the stalks by means of the stripping platform D and the pulling and carrying reel F. The lower edges of the walls 15 and 16 at the opposite ends thereof are provided with depending feet 22, the purpose of which will be hereinafter more fully described, and the lower ends of the rear wall 16 between the feet 22 is provided with an outwardly extending flange 23. A pan 24 is arranged in the lower end of the hopper C and includes the longitudinally extending lower wall 25, and the outwardly extending upwardly disposed inclined side walls 26. These side walls 26 are provided with horizontally disposed flanges 27 and 28. The flange 28 is secured to the flange 23 formed on the rear wall. The beams 18 are preferably a part of the side walls 26 and in fact form a continuation thereof.

The stripping platform D extends forwardly from the hopper C and across the opening 21 formed therein. This platform includes a plurality of spaced stripping prongs 30, which are provided with angular inner ends 31. The prongs 30 are held in place by a longitudinally extending bar 32, the inner surface of which may be grooved as at 33 for the reception of the angular ends 31 of the prongs. This bar 32 firmly clamps the angular ends of the prongs in engagement with the forward side wall 26 of the pan 24. If so desired, the end prongs 30 may curve outwardly as at 35. It can be seen that these prongs extend substantially flush with the flange 27 formed on the forward side wall 26 of the pan. In order to prevent falling of the ears of corn off the side of the stripping platform, the side plates 36 are provided. These side plates 36 may be secured in any preferred manner to the front wall 15 of the hopper.

It can be seen that the stalks of corn will ride in between the prongs, and that the prongs will have a tendency to pull the ears of corn therefrom.

In order to facilitate the pulling or stripping of the ears of corn from the stalks, and to carry the ears of corn into the hopper and onto the pan 24, the reel F is provided.

The reel F includes a longitudinally extending shaft 38 to which are rigidly attached the side arms 39. These side arms have their terminals connected by longitudinally extending channel beams 40, which carry the resiliently mounted stripping fingers 41. These stripping fingers 41 are slidably carried by the channel beams 40, which may be disposed in opposite relation to each other, and the fingers have coiled around the same the expansion coil springs 42. These coil springs 42 seat against suitable washers or pins carried by the prongs and against the inner portion of the channel beams. Thus it can be seen that the fingers 41 are normally urged outwardly. When the reel F is in operation, it can be seen that the fingers will be swept downwardly, and into engagement with the ears of corn, and which will pull the same off of the stalks and throw the same into the hopper. In order to permit rotation of the reel, a transversely extending shaft 43 is rotatably mounted in suitable bearings carried by the outer end of the hopper. This shaft 43 is connected by suitable bevelled gearing 44 with the main drive shaft 45, which is adapted to be driven in any preferred manner from the tractor. The forward end of the shaft 43 is connected by suitable bevelled gearing 46, with the shaft 38.

As shown, the shaft 45 is provided with a drive pulley 46, which has trained around the same a drive belt 47', which can be in turn trained around the drive pulley 13 of the tractor. It is to be understood that the shafts 45 and 43 can be driven in any preferred manner from the tractor, and that the arrangement of these shafts can be varied in accordance with the style of tractor with which the harvester is being used.

The conveyor G is arranged in the hopper C, and is adapted to carry the ears of corn stripped from the stalks to one end of the device. This conveyor mechanism includes a belt consisting of a pair of oppositely disposed endless chains 47 which are trained around suitable sprocket wheels 48 arranged at the ends of the hopper. The sprocket wheels 48 are keyed or otherwise secured to transversely extending shafts 49 mounted in suitable bearings carried by the depending feet 22 of the front and rear walls of the hopper. The chains 47 are connected by suitable transversely extending flights 50. The shaft 49 which is directly below the drive shaft 43 may be driven by means of a suitable sprocket chain 51 which may be trained around sprocket wheels keyed respectively to the shaft 43, and the mentioned shaft 49.

The elevator mechanism H also comprises an endless belt. This endless belt is mounted between a pair of side plates 52, the inner ends of which are connected by suitable hinged members 53, with the inner feet 22 of the front and rear walls 15 and 16. The side plates 52 adjacent to their upper ends have pivotally connected thereto as at 54 a yoke 55. The inner end of this yoke 55 carries a rod 56, which is adapted to extend between a pair of spaced ears 57, which are carried by one of the end U-shaped strength members 20. These ears 57 are provided with aligned openings and a bolt or the like 58 is adapted to be inserted through these openings, and through any one of a plurality of openings 59 formed in the rod 56. It can be seen that by placing the bolt 58 in any one of the various openings 59, the elevator frame can be raised and lowered. The elevator belt H includes a pair of spaced endless chains 60, which may be connected by suitable curved plates or the like 61. These chains are trained around pairs of upper and lower sprocket wheels 62, which are keyed or otherwise secured to suitable upper and lower shafts 63 and 64. The innermost shaft 49 and the lowermost shaft 63 are operatively connected together by means of spur gear wheels 65, which may be keyed to their respective shafts. It thus can be seen that during the actuation of the conveyor G, the elevator H will be driven therewith.

In order to permit husking of the corn, the mechanism I is provided. This husking mechanism I comprises a plurality of husking rollers 66, which are provided with longitudinally extending pulling teeth 67. As clearly shown in Figures 4 and 6 of the drawings, these teeth 67 are intermeshed, so that the rollers will be synchronously operated. These rollers are provided with end spindles 68, which are rotatably mounted in bearing blocks 69 which are slidably mounted in longitudinally extending U-shaped guide ways 70, which are secured to the inner surface of the side plates 52. These guide ways 70 have mounted therein expansion springs 71, which bear against the outermost pair of bearing blocks, and thus resiliently hold the husking rollers together. It can be seen that the husking rollers 66 will be operated in pairs, that is, every other roller will be operated in opposite direction, which will tend to pull the husks from the ears of corn. These rollers are driven from one of the spur gear wheels 65, and the lowermost husking roller 66 has its spindle provided with a relatively small spur gear wheel 72, which meshes with one of the sprocket wheels 65.

In case it is not desired to remove the husk from the corn, a shield 73 is utilized. This shield 73 can be formed of relatively thin metal and inserted between the upper run of the elevator belt H and the rollers 66. It can be seen that the side edges of this plate will be placed upon the upper edges of the guides 70. This plate then forms a table for the upper run of the elevator belt, as in the usual constructions of elevators.

The means J, which has been provided for connecting the harvester B with the tractor A may also be varied, without departing from the spirit or scope of the claims, so as to accord with various types of tractors.

As shown this connecting means J includes pairs of upper and lower rearwardly extending arms 75. These arms have their inner ends provided with guides 76. These guides 76 are slidably mounted upon the vertically disposed beams 77 which are provided with guide flanges 78. These beams 77 may be connected by upper and lower arms 79, with the radiator 12 and the forward dead axle of the tractor, in any preferred manner. It thus can be seen that the harvester is slidably connected with the tractor, and in order to facilitate the sliding movement of the harvester, and to hold the same in any preferred adjusted position, a raising and lowering shaft 80 is provided. This shaft 80 is provided with exterior screw threads and is threaded into a cross beam 81 carried by the upper ends of the beams 77. The lower end of the shaft 80 is rotatably mounted in a suitable bearing 82 carried by a cross rod 83' which is carried by the lower pair of arms 75 carried by the hopper C. The upper end of the shaft 80 is provided with a crank 83 for facilitating the rotation thereof. By turning the crank 83 it can be seen that the harvester B can be readily raised and lowered so as to regulate the height of the stripping platform D in relation to the corn to be harvested.

In operation of the improved harvester, the same is connected with the tractor, as shown in Figures 1 and 2 of the drawings, and the height of the tractor may be adjusted, as heretobefore described. The harvester is then set in operation, and the same is driven over the field of corn to be harvested. The prongs 30 will ride in between the stalks and tend to pull the ears of corn therefrom, while the stripping fingers 41 of the reel F will forcibly engage the ears of corn and pull the same from the stalks and throw the same into the hopper. The ears of corn will then be engaged by the conveying belt G and moved out of the hopper and thrown on to the elevating belt H, which will elevate the same and dump the same into a suitable barge or other wagon which may be driven along side of the tractor. As the ears of corn are being elevated, the husks will be detachably removed therefrom by means of the husking rollers 66, as heretobefore described.

From the foregoing description, it can be seen that a novel form of corn harvester has been provided, which can be carried by and attached directly to an ordinary type of tractor, and which is of exceptionally simple and durable construction, and which will not only pull the ears of corn from the standing stalks but will also husk the ears of corn as the same are being elevated.

Changes in details may be made, without departing from the spirit or scope of this invention; but,

I claim:

1. A corn harvesting machine comprising a longitudinally extending hopper, a conveyor belt mounted within said hopper, a forwardly extending platform carried by the hopper, the platform including a plurality of spaced prongs, a rotatable reel carried by the hopper and arranged above the platform, a plurality of spring pressed sliding stripping fingers carried by the reel for cooperation with the platform, and an elevating belt arranged on one end of said conveyor belt for receiving the ears of corn therefrom, and means for raising and lowering said elevator belt.

2. In a corn harvesting machine, means for stripping ears of corn from the standing stalks, an elevator belt, a plurality of husking rollers arranged transversely of the belt and between the runs thereof, means for operating said husking rollers, and a removable table arranged to be inserted between said rollers and the uppermost run of said elevator belt.

3. In a corn harvesting machine, means for stripping ears of corn from the standing stalks, an elevator belt, a plurality of husking rollers arranged transversely of the belt and between the runs thereof, means for operating said husking rollers, a removable table arranged to be inserted between said rollers and the uppermost run of said elevator belt, and means for holding the husking rollers in resilient intermeshing engagement.

4. The combination with a tractor, of a corn harvesting machine carried by and arranged in front of the tractor comprising a stripping platform including a plurality of prongs, means for raising and lowering the platform in relation to the ground, a conveyor belt arranged in rear of the platform, a reel arranged above the platform for carrying the ears of corn stripped from the stalk onto the conveyor belt, husking rolls arranged transversely of the belt and between the runs thereof, means for operating said husking roll, and a removable shield fitted between said rolls and the uppermost run of the elevator belt.

5. The combination with a tractor, of a harvesting machine attached to and carried directly by said platform including a stripping platform, a conveyor belt arranged in rear of the platform, means mounted above the platform for moving the ears of corn harvested from said platform to said conveyor belt, an elevator belt arranged to receive the ears of corn from the conveyor belt, husking rolls arranged transversely of the elevator belt and between the runs thereof, means for operating said husking rolls, and a removable shield arranged between said husking rolls and the uppermost run of the elevator belt.

6. The combination with a platform, of a pair of vertically disposed rigid guides carried by the platform, of a harvesting machine including attaching members slidably mounted on said guide ways, means for raising and lowering the members on said guide ways and for holding the same in any preferred adjusted position, the harvesting machine including a stripping platform, and means for carrying the harvested ears of corn away from said platform, said means including a conveyor belt, husking rolls arranged transversely of the belt between the runs thereof, means for operating said husking rolls, and a removable shield arranged to be inserted between said rolls and the uppermost run of the belt.

7. In a corn harvester, a longitudinally extending casing, means carried by the casing for stripping ears of corn from standing stalks, a conveyor belt arranged in the casing, an elevator belt arranged at one end of the casing and adapted to receive the ears of corn from the conveyor belt, a plurality of husking rolls arranged between the runs of one of said belts, and a shield disposed between the husking rolls and the upper run of the belt.

8. A corn harvester including a conveyor belt, husking rolls arranged between the runs of said belt, and a shield interposed between the upper run of the belt and the husking rolls.

CARTER F. BUSSE.